US006732243B2

(12) United States Patent
Busser et al.

(10) Patent No.: US 6,732,243 B2
(45) Date of Patent: May 4, 2004

(54) DATA MIRRORING USING SHARED BUSES

(75) Inventors: Richard W. Busser, Longmont, CO (US); Ian R. Davies, Longmont, CO (US)

(73) Assignee: Chaparral Network Storage, Inc., Longmont, CO (US)

( * ) Notice: Subject to any disclaimer, the term of this patent is extended or adjusted under 35 U.S.C. 154(b) by 114 days.

(21) Appl. No.: 10/036,749

(22) Filed: Nov. 8, 2001

(65) Prior Publication Data

US 2003/0088735 A1 May 8, 2003

(51) Int. Cl.[7] .............................................. G06F 12/08
(52) U.S. Cl. ......................... 711/162; 711/161; 710/22
(58) Field of Search ................................ 711/161, 162; 710/22–28

(56) References Cited

U.S. PATENT DOCUMENTS

2001/0013076 A1 * 8/2001 Yamamoto ................... 710/33
2002/0099881 A1 * 7/2002 Gugel ......................... 710/26

* cited by examiner

Primary Examiner—Mano Padmanabhan
Assistant Examiner—Midys Inoa

(74) Attorney, Agent, or Firm—Sheridan Ross P.C.

(57) ABSTRACT

A network storage controller for transferring data between a host computer and a storage device, such as a redundant array of inexpensive disks (RAID), is disclosed. The network storage controller includes at least one channel interface module which is adapted to be connected to the host computer and storage device. The channel interface module is connected to a passive backplane, and selectively transfers data between the host computer and storage device and the passive backplane. The network storage controller also includes at least one controller management module, attached to the passive backplane. The controller management module communicates with the channel interface module via the passive backplane, and processes and temporarily stores data received from the host computer or storage device. In applications where redundancy is required, at least two controller management modules and at least two channel interface modules may be used. The controller management modules may mirror data between one another using the passive backplane and a shared communication path on the channel interface modules, thereby substantially avoiding the use of host or disk channels to mirror data. The channel interface modules are operable to connect the host computer or storage device to one or more controller memory modules. The controller memory modules may include a DMA engine to facilitate the transfer of mirrored data.

27 Claims, 13 Drawing Sheets

MIRRORING DATA IN AN ACTIVE/ACTIVE CONTROLLER PAIR USING PROCESSOR INTERRUPTS OVER SHARED DISK CHANNELS

DATA MIRRORING USING SHARED BUSES

FIELD OF THE INVENTION

The present invention is related to storing data in a multiple controller configuration, and in particular, to the mirroring of data using direct memory access engines.

BACKGROUND OF THE INVENTION

Network storage controllers are typically used to connect a host computer system with peripheral storage devices, such as disk drives or tape drives. The network storage controller acts as an interface between the host computer and the peripheral storage devices. In many applications, the network storage controller performs processing functions on the data transferred between the host computer and peripheral devices. One common application of such a system is a redundant array of inexpensive disks (RAID). A RAID system stores data on multiple disk drives to protect the data against disk drive failure. If one disk drive fails, then the RAID system is generally able to reconstruct the data which was stored on the failed drive from the remaining drives in the array. A RAID system uses a network storage controller, which in many cases includes a RAID controller, as an interface between the host computer and the array of disk drives.

Many applications require a storage system to have very high availability. This high availability is a key concern in many applications, such as financial institutions and airline reservations systems, because the users rely heavily on the data stored on the RAID system. In these type of applications, unavailability of data stored on the RAID system can result in significant loss of revenue and/or customer satisfaction. Employing a RAID system in such an application enhances availability of the stored data, since if a single disk drive fails, data may still be stored and retrieved from the system. In addition to the use of a RAID system, it is common to use redundant RAID controllers to further enhance the availability of a storage system. In such a situation, two or more controllers are used in a RAID system, with each controller having failover capability, where if one of the controllers fails the other remaining controller will assume operations for the failed controller. Such a platform enhances the availability of a RAID system, however, it can lead to several disadvantages, as will be discussed below.

FIG. 1 shows a block diagram representation of a dual controller configured RAID network storage controller 10, showing a fibre channel to fibre channel connection. That is, in this example, the host computer and the array of disk drives both communicate with the network storage controller using fibre channel connections. While fibre channel is a common channel medium is such systems, it should be understood that other channels may also be used, such as, for example, Small Computer System Interface (SCSI) or Ethernet. The RAID system shown in FIG. 1 includes two host ports, host port-1 14 and host port-2 18 and two disk ports, disk port-1 22 and disk port-2 26. Each host port 14, 18 may be zoned to different host computers, and each disk port 22, 26 may be zoned to different disk arrays, as is common in RAID systems and is well known in the art. The network storage controller 10 includes dual RAID controllers, controller-A 30, and controller-B 34. In a system employing zoning of controllers, controller-A 30 may be zoned to host port-1 14 and disk port-1 22, and controller-B 34 may be zoned to host port-2 18 and disk port-2 26.

As is understood in the art, systems which employ dual controllers require data mirroring between controllers to maintain cache coherency. Each controller 30, 34, must have a copy of the data and status of the other controller in order to maintain redundancy between the controllers and thus maintain operation of the RAID system if one controller fails. Mirroring data between controllers can decrease the performance of a RAID system because transferring data between controllers uses processing resources of the controllers, as well as channel bandwidth, as will be discussed in more detail below.

The controllers 30, 34 are connected to a fibre channel bus 38, which is connected to two IO modules, IO module-1 42, and IO module-2 46. Each controller 30, 34, includes a CPU subsystem 50, a double data rate (DDR) memory 54, control logic 58, a dual port fibre channel connection with two host ports 62a, 62b and a dual port fibre channel connection with two disk ports 66a, 66b. The CPU subsystem 58 performs tasks required for storage of data onto an array of disks, including striping data, and initiating and executing read and write commands. The DDR memory 54 is a nonvolatile storage area for data and other information. The control logic 58 performs several functions, such as interfacing with the CPU subsystem 50, DDR memory 54, and the host ports 62a, 62b and the disk ports 66a, 66b. The control logic 58 may also have other functions, including a parity generation function, such as an exclusive OR (XOR) engine. The host ports 62a, 62b and disk ports 66a, 66b provide communications with the fibre channel backplane 38. The IO modules 42, 46 include link resiliency circuits (LRCs) 70, also known as port bypass circuits, which function to connect each host port 14, 18 and each disk port 22, 26 to each controller 30, 34. This allows both controllers 30, 34 to have access to both host ports 14, 18 and both disk ports 22, 26.

In order to provide full redundancy, each controller must have a connection to each host port 14, 18 and each disk port 22, 26. This way, if there is a failure of one of the controllers, the other controller can continue operations. However, when using zoning techniques to enhance the performance of a RAID system, half of these ports are passive. For example, if controller-A 30 is zoned to host port-1 14 and disk port-1 22, then controller-A 30 receives all communications from host port-1 14 and controls the disk array(s) on disk port-1 22. Likewise, controller-B 34 would be zoned to host port-2 18 and disk port-2 26. These zoning techniques are well known in the art and can increase performance of the RAID system as well as simplify control and communications of the two controllers 30, 34. In the example of FIG. 1, on controller-A 30 the host port connection 62a and disk port connection 66a are connected to host port-1 14 and disk port-1 22, respectively, through the LRCs 70 of IO module-1 42. Because controller-A 30 is zoned to host port-1 14 and disk port-1 22, the host port connection 62a and disk port connection 66a actively communicate with host port-1 14 and disk port-1 22. The remaining host port connection 62b and disk port connection 66b are connected to host port-1 18 and disk port-2 26, respectively, through the LRCs 70 of IO module-2 46. These connections are typically passive connections, as controller-A 30 is not actively communicating with host port-2 18 and disk port-2 26, so long as controller-B 34 does not fail. Likewise, controller-B 34 would be zoned to host port-2 18 and disk port-2 26. Thus, on controller-B 34, the host port connection 62b and disk port connection 66b would communicate with host port-2 18 and disk port-2 26 through LRCs 70 of IO module-2 46. The remaining host port connection 62a and disk port connection 66a would be connected to host port-1 14 and disk port-1 22 through LRCs 70 of IO module-1 42.

As mentioned above, in typical redundant controller operations data is mirrored between controllers. When mirroring data between controller-A 30 and controller-B 34, it is common to transfer the mirrored data over the shared disk port connections, namely disk port connection 66b of controller-A 30, and disk port connection 66a of controller-B. For example, controller-B 34 may receive data over host port-2 18 that is to be written to an array of drives over disk port-2. Controller-B 34 would receive this data and store it in memory 54. In order to maintain cache coherency, controller-B 34 must also communicate this data to controller-A 30, thus both controllers have the data, and if one fails the other is still be able to write the data.

In a traditional system, this mirroring is accomplished over several steps. FIG. 12 is a flow chart representation of the steps required to mirror data between two controllers in an active/active controller pair. Initially, controller-B 34 receives data to be written to the disk array, as indicated by block 80. To mirror the data, controller-B 34 issues a first mirror command causing a first interrupt to controller-A 30, notifying controller-A 30 that a message is being sent, as noted by block 82. An interrupt is a signal generated automatically by hardware on a controller when a message is received, in this example controller-B, to a processor, in this example hardware on controller-A, which causes the processor to stop what it is doing and service the interrupt. When controller-A receives the first interrupt, it discontinues any processing activity, and processes the first mirror command. Controller-B 34 next issues a second mirror command containing metadata which causes a second interrupt, as indicated by block 84. The metadata contains the actual message body, and information showing controller-A 30 the memory location at which to store the user data. Next, controller-A 30 marks its nonvolatile memory (NVRAM) contents as invalid for the data blocks specified in the metadata, as indicated by block 86. Next, controller-B 34 issues a third mirror command containing user data, which causes a third interrupt, according to block 88. Controller-A receives the user data, stores the user data in the specified location in its NVRAM, and marks the NVRAM contents as valid for the specified data blocks, as noted by block 90. Once controller-B 34 has completed the associated write operation, it then issues a fourth mirror command causing a fourth interrupt and a notification the write is complete, as noted by block 92. Controller-A then marks the write complete, as indicated by block 94.

As can be seen, while this mirroring technique is successful in copying data between controllers, it can use significant processing resources. Each write operation requires four interrupts, which cause the receiving processor to suspend any tasks it is currently processing and service the interrupt. Thus, it would be advantageous to have a network storage controller which consumes less processing resources for mirroring data.

Additionally, this mirroring is typically accomplished using the disk channels. In each of the mirror commands described above, controller-B 34 sends the data over the disk port connection 66a which connects to the LRC 70 connected to disk port-1 22. The data transfers through the LRC 70, where it is then received at the disk port connection 66a on controller-A. Controller-A then receives the data and performs appropriate processing and storage steps. Likewise, if controller-A 30 receives data to be written to the array of disks on disk port-1 22, it sends the data to controller-B 34 using the same mirroring technique. Note this technique does not require dedicated disk ports and more than one disk port can be used While this uses the remaining disk port on each controller, the second host port on each controller remains unused, thus passive, during normal operation of the system. The passive ports on each controller adds a significant amount of hardware to the controller, and can add significant cost to the network storage controller 10. Thus, it would be advantageous to provide a redundant network storage controller which maintains high availability while reducing cost and hardware associated with passive ports located on the controllers.

Additionally, mirroring data in such a system results in the mirrored data and storage data being sent over the same port for the controller that is receiving the mirrored data or being used to transfer data to the disk. Bandwidth to and from the disk array is consumed by the mirrored data, which can reduce the performance of the network storage controller. Thus, it would be advantageous to have a network storage controller which consumes little or no disk channel bandwidth when mirroring data between controllers.

Furthermore, with the continual increasing of demand for data storage, RAID controllers often require upgrades with additional disk drives or faster bus interfaces. However, a RAID controller may not be configured to add additional bus interface capacity or may not support a new type of bus interface. Such controllers commonly have to be replaced when an upgrade is performed. This replacement of controllers can increase the cost of upgrading a RAID system. The replacement of an operational RAID controller represents a loss in value that may inhibit the decision to upgrade a RAID system. Thus, it would be advantageous to have a system which can support upgrades of capacity, as well as new interface types, with ease and reduced cost.

Accordingly, there is a need to develop an apparatus and method for use in a network storage controller which: (1) provides redundancy with reduced cost for passive components, (2) reduces the amount of mirrored data which is sent over the disk or host ports, (3) reduces the processing overhead involved with mirroring data, and (4) provides easily replaceable and upgradeable components.

SUMMARY OF THE INVENTION

In accordance with the present invention, a method and apparatus are provided for mirroring data in a storage system including a storage array. The apparatus includes a first controller management module including a first processor and a first direct memory access engine. The first processor is used in controlling read operations and write operations involving the storage array. The first direct memory access engine is used in storing data received by the first controller memory module. The apparatus also includes a second controller management module including a second processor and a second direct memory access engine. The second processor is used in controlling read operations and write operations involving the storage array. The second direct management access engine can be used in transferring data from the second controller management module to the first controller memory module. Data is mirrored from the first controller management module to the second controller management module using the first direct memory access engine while avoiding interruption of the second processor. The first direct memory access engine is separate from but in communication with the first processor and the first processor controls mirroring of data using the first direct memory access engine. In one embodiment, the first controller management module includes a field programmable gate array. The first direct memory access engine is in communication with at least portions of the field programmable gate array, and the first direct memory access engine can be a part of the field programmable gate array.

In one embodiment, the apparatus includes a first channel interface module having a first shared path. The first channel interface module communicates with the first controller memory module and the first shared path is used in transferring data between the first controller management module and the second controller management module. A passive backplane interconnects the first channel interface module and the first controller management module. The second processor controls operations associated with the second controller management module while the data is being mirrored to the second controller memory module. The data is mirrored to the second controller management module independently of the second direct memory access engine. Within the second controller management module, there is non-volatile memory, and data can be stored in the non-volatile memory independently of the second processor. The first direct memory access engine marks portions of the non-volatile memory where the data is to be stored as invalid, and transfers the data to the non-volatile memory. The portions of the non-volatile memory where the data is stored are then marked as valid.

The method includes mirroring data from the first controller management module to the second controller management module using the first direct memory access engine. The first processor within the first controller management module determines that data mirroring is to be conducted. The second processor within the second controller management module controls read and write operations involving the storage array, and the data mirroring is conducted while avoiding interruption of the second processor. Hence, the second processor can continue performing its own operations during the time that the data is being mirrored. The data mirroring is conducted using the first direct memory access engine without requiring the second direct memory access engine. During the mirroring, data is stored in non-volatile memory in the second controller management module. When conducting the mirroring, the first direct memory access engine is used to mark contents of the non-volatile memory that is to receive data as invalid and transfer the data to the non-volatile memory. The first direct memory access engine then marks the contents of the non-volatile memory that received the data as valid. In one embodiment, the first direct memory access engine is also used in determining parity for information stored on the storage array using the first controller management module.

DETAILED DESCRIPTION

Figure 1:
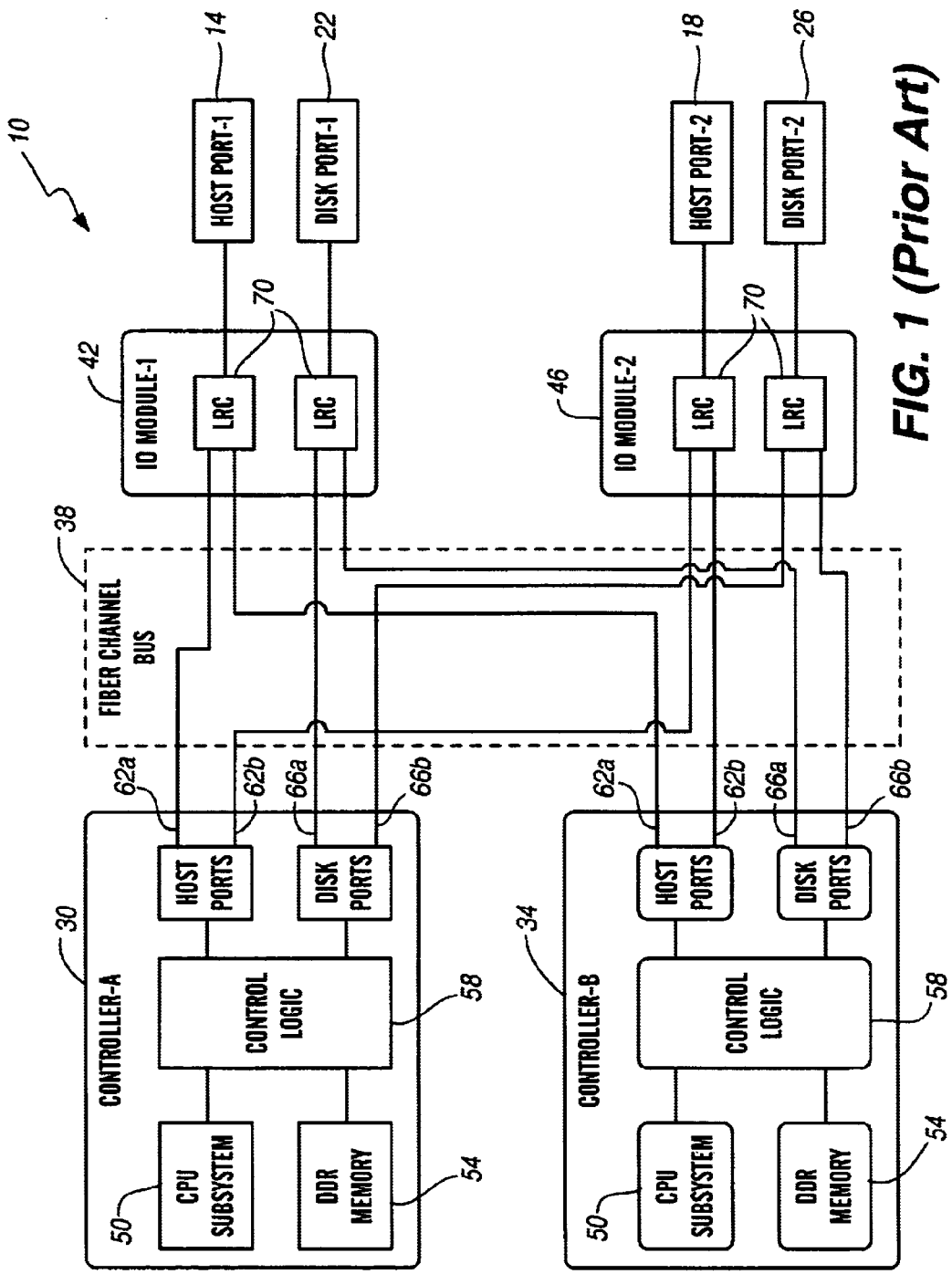
FIG. 1 is a block diagram representation of a conventional dual controller network storage controller.
Figure 2:
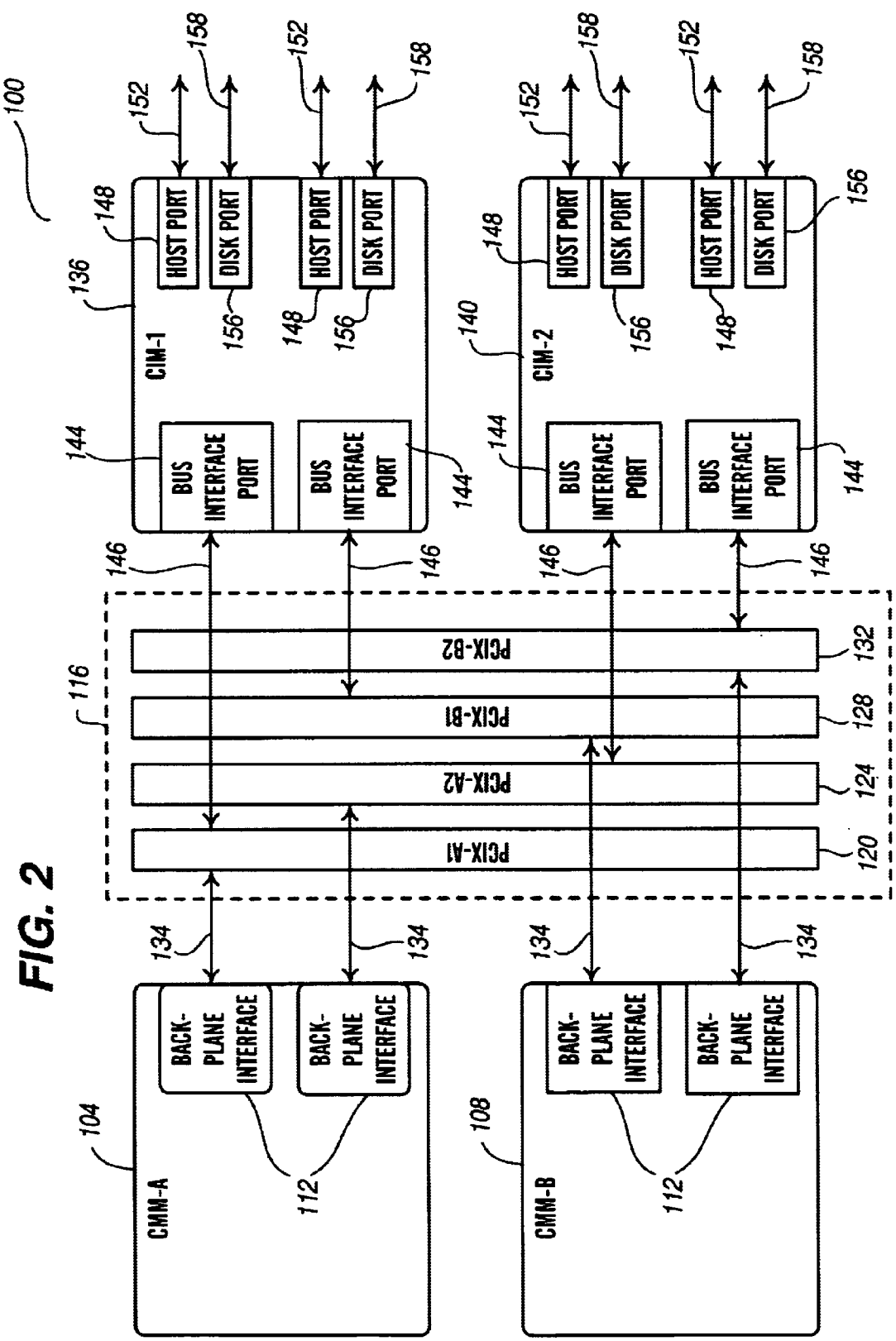
FIG. 2 is a block diagram representation of a network storage apparatus of the present invention.

With reference now to FIG. 2, a block diagram of a network storage apparatus 100 of the present invention is shown. The network storage apparatus 100 includes one or more controller management modules (CMMs). In the embodiment shown in FIG. 2, there are two CMMs, CMM-A 104, and CMM-B 108, although a single CMM may be used in applications where no redundancy is required, and additional CMMs may be used in applications requiring additional redundancy or higher performance. Each CMM 104, 108 has two backplane interfaces 112. The system has a passive bus backplane 116, which has two buses for each CMM. In the embodiment shown, the passive bus backplane 116 uses next generation Peripheral Component Interconnect (PCIX) buses, although it will be understood that any bus technology may be used, including switched architectures such as Infiniband or RapidIO, as well as traditional bus architectures such as PCI local bus. The passive bus backplane 116 can have a first data bus 120, a second data bus 124, a third data bus 128, and a fourth data bus 132. The first data bus 120 and second data bus 124 connect to the backplane interfaces 112 on CMM-A 104 via CMM bus connections 134, and the third data bus 128 and fourth data bus 132 connect to the backplane interfaces 112 on CMM-B 108 via CMM bus connections 134.

In the embodiment shown in FIG. 2, PCIX buses are used in the passive backplane 116. The use of PCIX buses allows relatively high performance bus interconnection components connected to the passive backplane 116 with well understood and relatively simple bus protocol. PCIX technology is a next generation technology which leverages the traditional PCI bus.

The network storage apparatus 100 has one or more channel interface modules (CIMs). In the embodiment shown in FIG. 2, there are two CIMs, CIM-1 136 and CIM-2 140, although it will be understood that this number may vary depending upon the configuration and application in which the network storage apparatus 100 is used. Each CIM 136, 140 has two CIM bus interface ports 144a, 144b. On each CIM 136, 140 one CIM bus interface port 144a connects to one bus which is connected to CMM-A 104, and one CIM bus interface port 144b connects to one bus which is connected to CMM-B 108 via CIM bus connections 146. In the embodiment shown in FIG. 2, CIM-1 136 connects to the first data bus 120 and third data bus 128, and CIM-2 108 connects to the second data bus 124 and fourth data bus 132.

Each CIM 136, 140 has two host ports 148, which connect to host channels 152, which connect to a host computer (not shown). Each CIM 136, 140 also has two disk ports 156, which connect to disk channels 158, which connect to one or more storage devices (not shown). The storage devices may be a storage array, such as a RAID array. In alternative embodiments, as will be discussed in more detail below, a CIM may contain multiple host ports or multiple disk ports, depending upon the application and channel interface required.

When the host computer sends data, it is sent over the host channel 152 and is received at the host port 148 on the CIMs 136, 140. This data is sent to the CMMs 104, 108 via the passive backplane 116. The CMMs 104, 108 contain memory and processing units, as will be described in more detail below, which arrange the data into an appropriate form for storage on the storage devices. For example, if the system is used in a RAID 5 disk array system, the CMMs 104, 108 will arrange the data into appropriate stripes of data to be written to the disks, and will compute a parity block for the stripe of data. Thus, the CMMs 104, 108 process the data and format it for storage. Once this is complete, the CMMs 104, 108 transfer the data, ready for storage, to the CIMs 136, 140 via the passive backplane 116. The CIMs 136, 140 then send the data to the storage devices connected to the disk port 156. As will be described in more detail below, data can be transferred between the CMMs 104, 108 using the CIMs 136, 140 and the passive backplane 116. Additionally, as will also be discussed below, the CMMs 104, 108 and CIMs 136, 140, may be associated with specific drives or hosts.

This configuration provides a modular and redundant architecture in which the host channel 152 and the disk channel 158 need not necessarily be the same channel medium. The modularity of the CMMs 104, 108 and CIMs 136, 140 also allows for relatively low cost upgrades and easy replacement of failed units. The use of a passive backplane 116 to exchange data between CMMs 104, 108 also avoids the use of channel bandwidth of the disk channel 158 or the host channel 152, as would be required for data mirroring in a traditional redundant controller environment, as will be discussed below.

Figure 3:
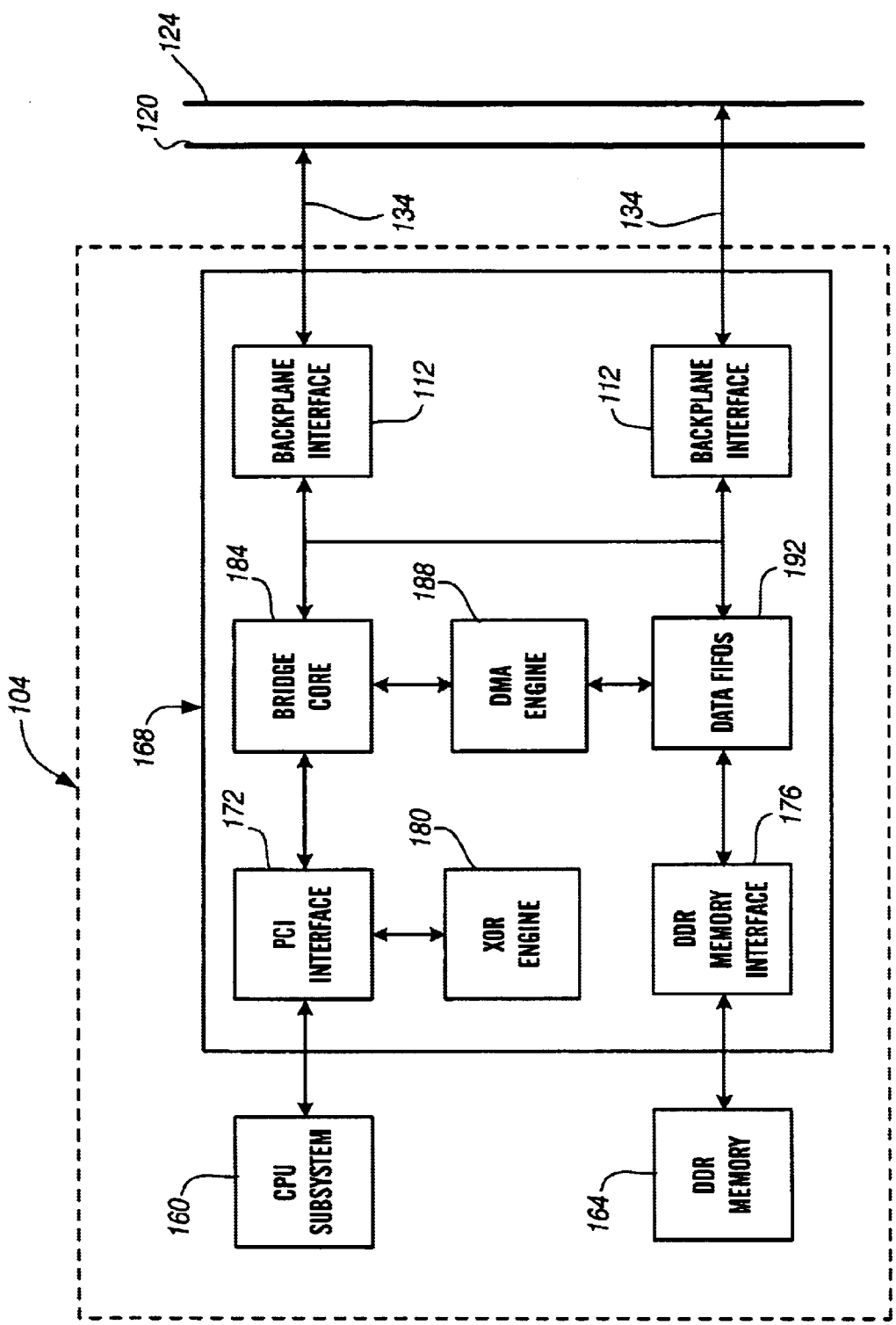
FIG. 3 is a block diagram representation of a controller management module of the present invention.

With reference now to FIG. 3, a block diagram representation of a CMM 104 is shown. The CMM 104 contains several components, including a CPU subsystem 160, a memory 164, and an interface FPGA 168. The CPU subsystem 160 may be a standard type CPU, such as a widely used microprocessor, or may be an application specific processor. In one embodiment, the CPU subsystem 160 is an Intel Pentium (TM) class microprocessor. The CPU subsystem 160 communicates with the interface FPGA 168 using a standard bus, such as a PCI bus. The memory 164 allows for temporary storage of data within the CMM 104. This storage is used during normal read and write operations for several purposes, such as storing queued data that is waiting to be written to the disk array. In one embodiment, a DDR memory DIMM is used, which communicates with the interface FPGA 168 using a bus interface.

The interface FPGA 168 contains a number of components. It will be understood that these components may be combined into a single FPGA, or may exist on several components within the CMM 104. In one embodiment, shown in FIG. 3, the interface FPGA 168 includes a PCI interface 172, a memory interface 176, an XOR engine 180, a bridge core 184, a DMA engine 188, data FIFOs 192, and two backplane interfaces 112. The PCI interface 172, acts as an interface between the CPU subsystem 160 and the other portions of the interface FPGA 168. In the embodiment shown, this interface uses a standard PCI bus connection. The PCI interface 172 connects to a bridge core 184, which in turn connects to the backplane interfaces 112, which interface with the first data bus 120 and second data bus 124 located on the passive backplane 116.

The memory interface 176, acts as an interface between the memory 164 and the interface FPGA 168. The XOR engine 180 serves to perform XOR operations on the data to be stored, in order to obtain parity information on the data which is to be written. The XOR engine 180 is also used in situations where the use of parity information is required to recover data from a failed drive in a disk array. The XOR engine 180 connects to the CPU subsystem 160 through the PCI interface 172. The data FIFOs 192 connect to the memory interface 176 and bridge core 184, and in turn connect to the PCIX interfaces 196. The data FIFOs serve as a queue which is used by the CMM 104 to manage read and write operations. The DMA engine 188 serves to provide DMA data to another CMM when the CMMs are operating to provide redundancy, as will be discussed in detail below. The DMA engine 188 in one embodiment is also used in conjunction with the XOR engine 180 to perform XOR operations, reading data from two areas within the memory 164 and providing the data to the XOR engine 180, and writing the output of the XOR engine to a third area within the memory 164.

Figure 4:
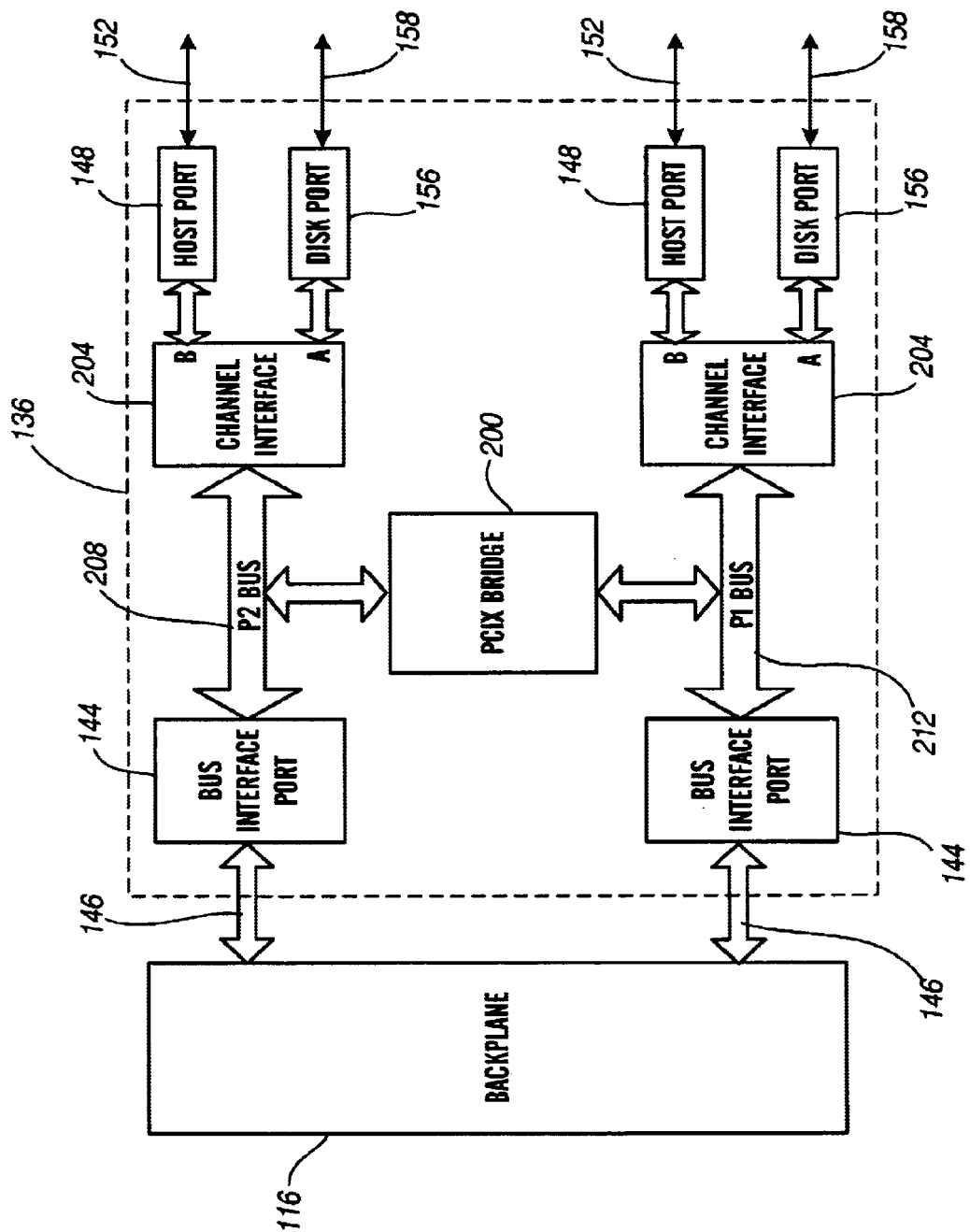
FIG. 4 is a block diagram representation of a channel interface module of the present invention.

Referring now to FIG. 4, a block diagram representation of a CIM 136 is shown. The CIM 136 contains a PCIX bridge 200, and two channel interfaces 204. The PCIX bridge 200 is operable to connect a first switched path 208, and a second switched path 212. Each switched path 208, 212 connects to a bus interface port 144, which in turn connects to a PCIX bus on the passive backplane 116 via a CIM bus connection 146. The PCIX bridge 200 is operable to monitor data sent over the switched PCIX paths 208, 212, and determine whether the data is to be routed between the switched PCIX paths 208,212. This monitoring and routing of data between the switched PCIX paths 208, 212, is used mainly to enable mirroring operations between CMMs and will be described in more detail below.

The channel interfaces 204 connect the switched PCIX paths 208, 212 to the host port 148 and the disk port 156. The channel interfaces 204 are operable to monitor data sent over the switched PCIX paths 208, 212, and determine whether the data is to be routed to the host port 148 or disk port 156. This monitoring and routing passes data to the appropriate disk or host location and does not pass mirroring data through to the host or disk ports 148, 156. The channel interfaces 204 enable communication over the appropriate channel medium for the application. For example, if the host channels 152 and the disk channels 156 use fibre channel, the channel interfaces 204 would act as the interface between the switched PCIX paths 208, 212 and the fibre channel. Likewise, if the host channels 152 and the disk channels 158 use a SCSI channel, the channel interfaces 204 would act as the interface between the switched PCIX paths 208, 212 and the SCSI channel. If both the host channels 152 and the disk channels 158 use the same channel medium, the CIM 136 can be used for communication with both the host channels 152 and the disk channels 158 through the use of the host ports 148 and disk ports 156.

In one embodiment, the disk channel 158 and the host channel 152 do not use the same channel medium. In this embodiment, a different CIM is used for each different channel medium. For example, if the host computer used a fibre channel, and the disk array used a SCSI channel, the host computer would connect to one CIM, using a fibre channel interface, and the disk array would connect to another CIM, using a SCSI channel interface. If redundancy were required, two or more CIMs could be connected to each channel medium.

In the embodiment shown in FIG. 4, the first switched PCIX path 208 communicates with the first data bus 120 and the second switched PCIX path 212 communicates with the third data bus 128 through the bus interface port 144 and CIM bus connection 146. The PCIX bridge 200 may be used as a communication path for one CMM to communicate with another CMM, as will be discussed in detail below. It will be understood that a similar configuration is used for the remaining CIMs that are present on the network controller. For example, in the embodiment shown in FIG. 2, CIM-2 140 is connected to the third data bus 128 and the fourth data bus 132, and thus CIM-2 140 would have switched PCIX paths 208, 212 which communicate with the second data bus 124 and fourth data bus 132 respectively. Likewise, if more than two CIMs are present, they will be configured to communicate with the appropriate buses on the passive backplane 116 as required by the application.

Referring again to FIGS. 2–4, in one embodiment, CMM-A 104 and CMM-B 108 are each associated with a portion of each CIM 136, 140. In such a case, a CMM 104 or 108 has exclusive ownership of one PCIX path 208 or 212 by enabling access to that PCIX path 208 or 212 from the bus segment that the PCIX path 208 or 212 is connected to. For example, in one embodiment, CMM-A 104 employs PCIX path 208 in each CIM 136, 140 to communicate with the host channel 152 and disk channel 158. This association is achieved by connecting the bus interface port 144 associated with the first switched PCIX path 208 in CIM-1 136 to the first data bus 120 on the backplane 116. Likewise, the bus interface port 144 associated with the first switched PCIX path 208 in CIM-2 140 is connected to the second data bus 124 on the passive backplane 116. CMM-A 104 thus communicates to the host and disk channels 152, 158 through the first switched PCIX path on each CIM 136, 140. Similarly, the bus interface ports t44 associated with the second switched PCIX paths 212 in each CIM 136, 140 are connected to the third and fourth data buses 128, 132, respectively. CMM-B 108 thus communicates to the host and disk channels 152, 158 through the second switched PCIX path 212 on each CIM 136, 140.

Figure 5:
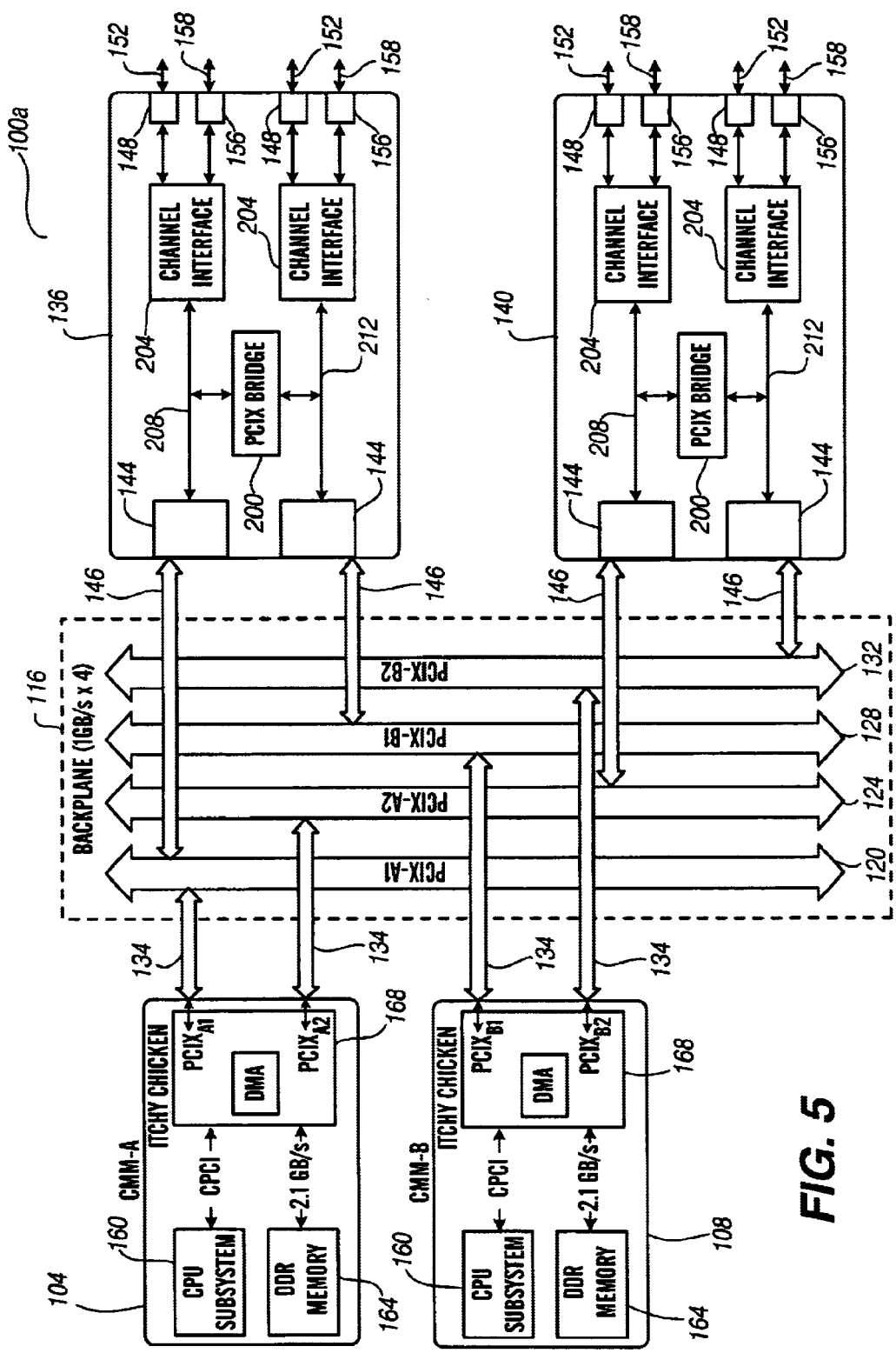
FIG. 5 is a block diagram representation of a redundant network storage apparatus of the present invention.

With reference now to FIG. 5, a block diagram representation of a network storage apparatus 100a containing redundant components is shown. In this embodiment, two CMMs are used, CMM-A 104 and CMM-B 108. Two CIMs are used, CIM-1 136 and CIM-2 140. CMM-A 104 and CIM-1 136 are both connected to the first data bus 120 in the passive backplane 116. CMM-A 104 and CIM-2 140 are both connected to the second data bus 124 in the passive backplane 116. CMM-B 108 and CIM-1 136 are both connected to the third data bus 128 on the passive backplane 116. CMM-B 108 and CIM-2 140 are both connected to the fourth data bus 132 on the passive backplane 116.

As will be understood by those of skill in the art, redundant controllers require mirroring of data between the two controllers attached to the storage subsystem. This is due to the use of a write back cache, where the controller receives data from the host computer, caches the data and sends a message to the host computer that the data has been written. Thus the host computer determines that the data has been written, when it is actually stored in the controller and is waiting there to be written to the drives in the disk array. To help ensure that this data is not lost in the event of a failure, redundant controllers mirror this data to the other controller, thus having another copy of the data on the other controller. This is known as cache coherency. In one embodiment, the CMMs 104, 108 mirror data to provide cache coherency to the network storage apparatus 100a. This can be done by implementing a DMA path between CMM-A 104 and CMM-B 108. This can be accomplished by providing a DMA engine 188 in the interface FPGA 168, as discussed above with respect to FIG. 3, and a shared path 216 utilizes the PCIX bridge 200 in each CIM 136, 140, as discussed above with respect to FIG. 4. Each CMM 104, 108, uses this DMA path to send data to the other CMM. By utilizing the DMA path, the two CMMs 104, 108 can mirror data without the need to use the host channel 152, or the disk channel 158, thus channel bandwidth in the disk channel 158 or host channel 152 is not consumed by the CMMs 104, 108 mirroring data.

Figures 12, 13:
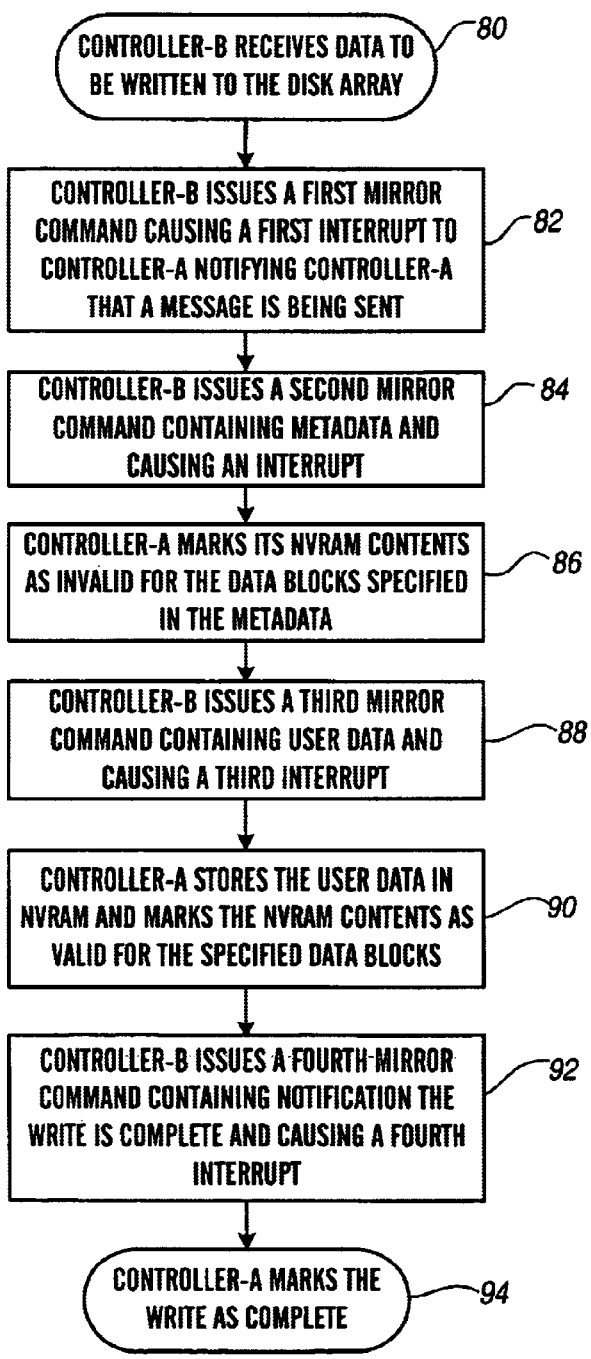
FIG. 12 is a flow chart representation of the steps utilized in mirroring data in an active/active controller pair using, processor interrupts over shared disk channels.
FIG. 13 is a flow chart representation of the steps utilized in mirroring data between controller management modules using shared buses and direct memory access.

In addition to consuming less channel bandwidth than used in traditional mirroring configurations, the network storage apparatus 100a can also be configured to use less processing resources than traditional techniques. FIG. 13 shows a flow chart representation of a DMA mirroring method used in one embodiment of the present invention. As will be understood by those of skill in the art, DMA is a capability provided by some computer bus architectures that allows data to be sent from an attached device to the computer's memory without consuming the computer's processing resources. In one embodiment, CMM-A and CMM-B have a specified portion of the DDR non-volatile random access memory (NVRAM) designated as an area to be used for direct memory access by the other CMM. When CMM-A 104 has data which needs to be mirrored to CMM-B 108, CMM-A 104 initially initiates a first DMA transaction to mark a portion of CMM-B DDR memory 164 contents as invalid for the data blocks associated with the write operation, as indicated by block 500. Also included in the first DMA transaction is the user data being mirrored, which is stored in the specified data blocks, as noted by block 500.

Figure 14:
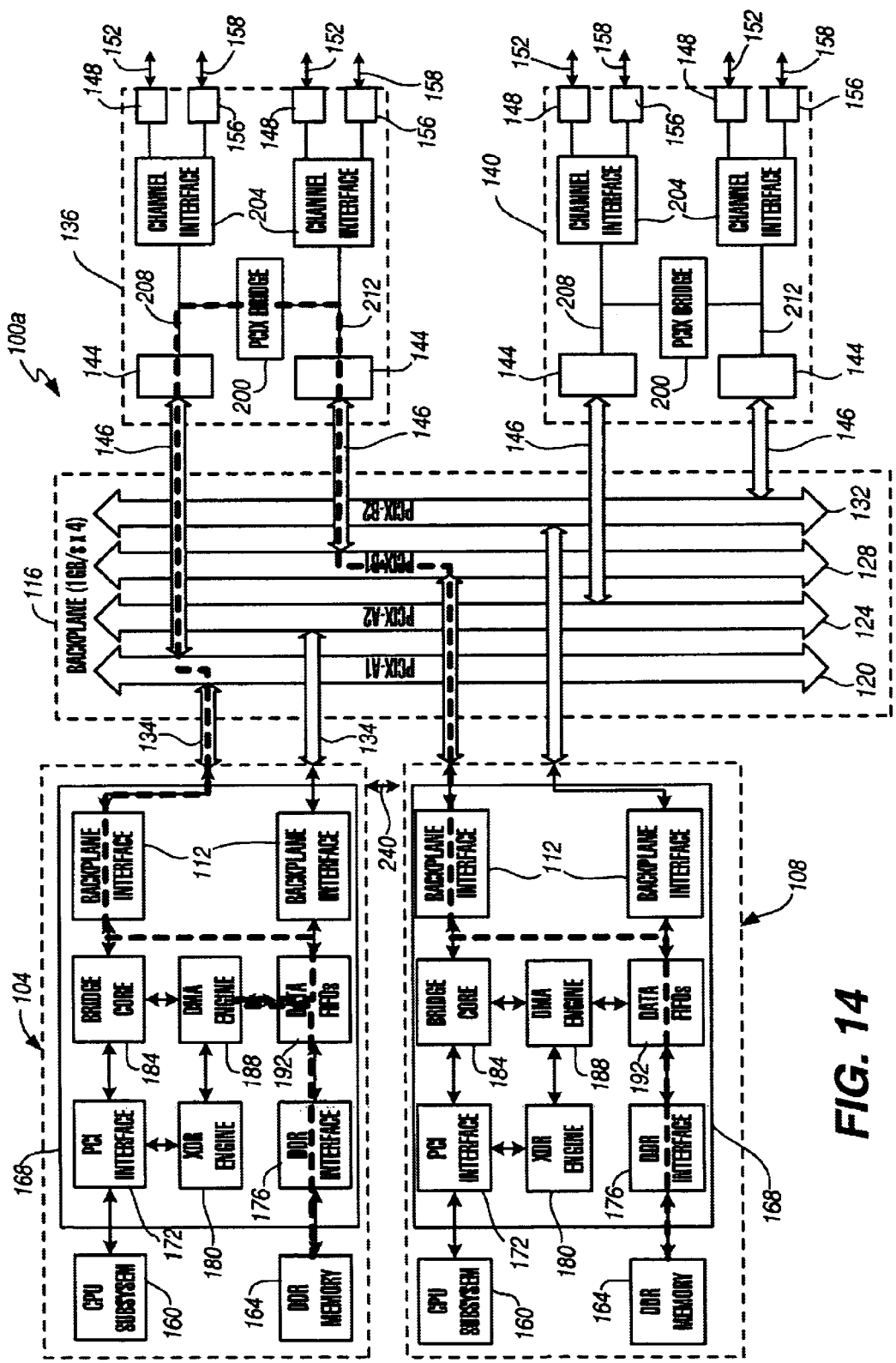
FIG. 14 is a block diagram representation of a network storage apparatus of the present invention highlighting a DMA path between CMM-A and CMM-B.

With reference to FIG. 14, the hardware associated with a DMA transaction is described in more detail. When conducting the DMA transactions, the CPU subsystem 160 of CMM-A 104 controls the operation of the DMA engine 188 on CMM-A 104. The DMA engine 188 on CMM-A 104 accesses the DDR memory 164 of CMM-B 108 through the PCIX bridge 200 of CIM-1 136, and the interface FPGA 168 of CMM-B 108. Thus, when given the command to mark CMM-B 108 DDR memory 164 contents invalid, the DMA engine 188 on CMM-A 104 accesses the DMA path through the data FIFOs 192 and backplane interface 112 of the CMM-A interface FPGA 168, and transmits the command through the DMA path to the CMM-B 108 interface FPGA 168. The command is routed through the CMM-B 108 interface FPGA 168 through the backplane interface 112 and data FIFOs 192 to the memory interface 176, and then to the DDR memory 164. This DMA path is indicated by the dashed lines of FIG. 14. Thus, the CMM-B CPU subsystem 160 and CMM-B 108 DMA engine 188 are not involved with the DMA transaction initiated by CMM-A 104. When transferring the user data, the CMM-A 104 CPU subsystem 160 continues the first DMA command. The DMA command indicates the source address within the CMM-A 104 DDR memory 164, the destination address within the CMM-B 108 NVRAM 164, and the length of the data block to be transferred. The CMM-A 104 DMA engine 188 receives the DMA command and accesses the CMM-A 104 DDR memory 164 through the data FIFOs 192 and memory interface 176. The CMM-A 104 DMA engine 188 then transfers the appropriate data from the CMM-A 104 NVRAM, 164 through the CMM-A 104 interface FPGA 168, over the DMA path, through the CMM-B 108 interface FPGA 168 and into the appropriate location in the CMM-B 108 DDR memory 164. Referring to block 504, CMM-A 104 then initiates a second DMA transaction to mark portions of the CMM-B 108 DDR memory 164 contents as valid for the specified data blocks. Since the transactions are DMA transfer, they do not require processing resources from CMM-B 108 or interrupting CMM-B 108, which enhances the performance of the system because CMM-B is able to perform other processing functions independently of the mirroring operation.

In another embodiment, the two DMA transactions shown in FIG. 13 are combined into a single ordered DMA transaction. In this embodiment, the DDR memory 164 in each CMM 108, 108 has two memory regions for storing metadata which is associated with the user data. When initializing a DMA transfer, a first unique string is stored in the first memory region, followed by the data to be transferred. At the end of the DMA transfer, the first unique string is stored in the second memory region. In the event that a CMM 104, 108 has to recover from a failure, the strings stored in the first and second memory regions are compared. The comparison is performed only in the event of a CMM failure, thus there is no loss in performance during regular operation. If the strings match, this indicates that the mirrored data is valid.

With reference again to FIG. 5, there is also a failover reset link 240 present between CMM-A 104 and CMM-B 108. The failover reset link 240 is used for communicating a failure of one of the CMMs 104, 108. In one embodiment, the failover reset link 240 is a serial connection between CMM-A 104 and CMM-B 108. In this embodiment, each CMM 104, 108 maintains a heartbeat signal which is communicated over the failover reset link 240, and monitored by the other CMM. If a problem is detected in the heartbeat signal, a CMM 104, 108 can send a signal over the failover reset link 240 to terminate the operation of the other CMM. For example, if CMM-B 108 has a failure or is not operating properly, CMM-A 104 will detect that the heartbeat signal from CMM-B 108 is no longer active. After a preset time period in which no heartbeat signal is received, CMM-A 104 sends a termination signal to CMM-B 108. When CMM-B 108 receives the termination signal, it discontinues operation. CMM-A then takes control of all read and write operations. This is necessary because CMM-B may have been operating in an abnormal way. Likewise, if CMM-A 104 failed CMM-B 108 would receive the indication over the failover reset link 240, and take control of all read and write operations. Thus, the system is redundant and continues to operate when a CMM 104 or 108 fails.

Figure 6:
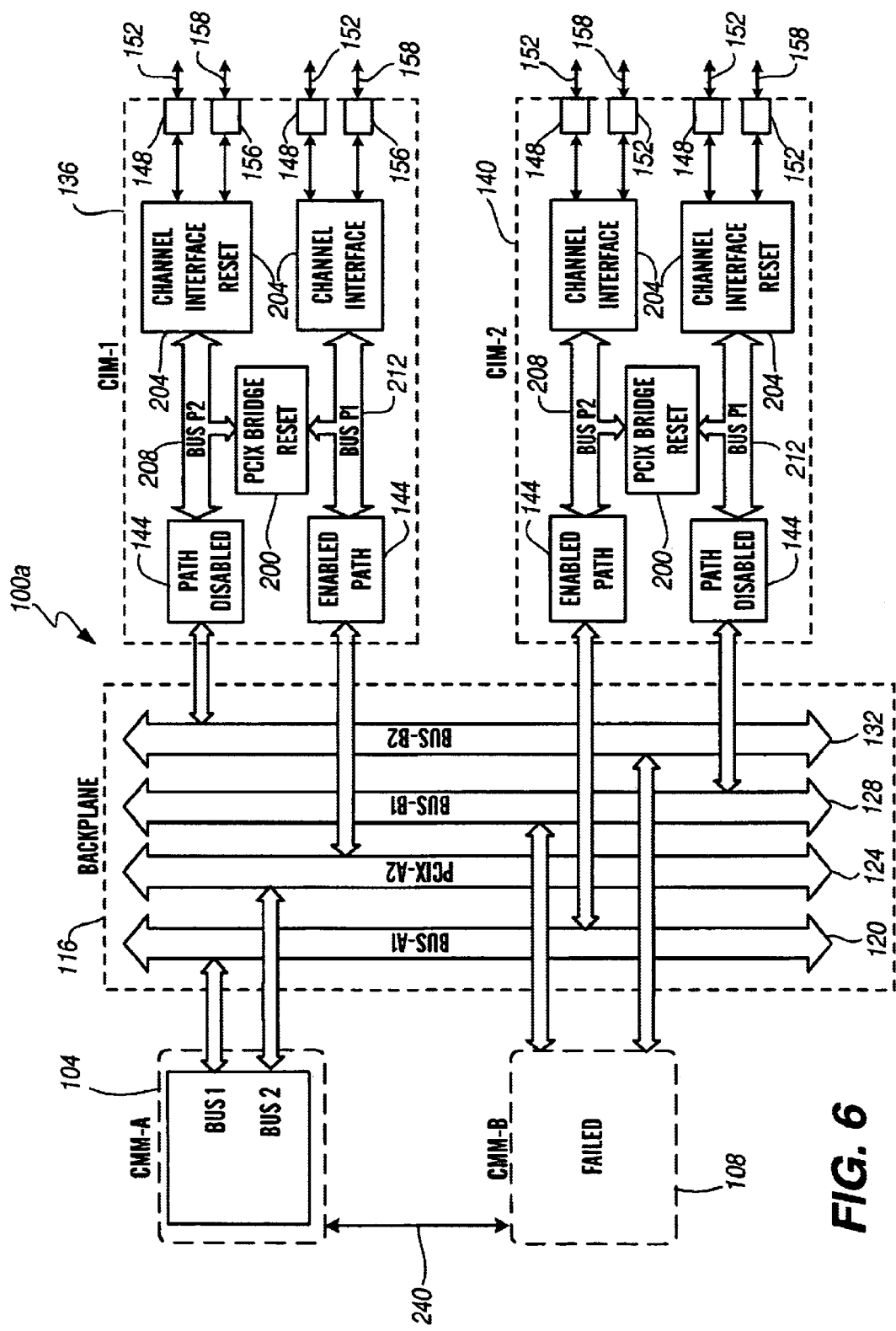
FIG. 6 is a block diagram representation of a redundant network storage apparatus showing a failed controller management module.

Referring now to FIG. 6, the operation of the system when a CMM fails will now be described. As shown in FIG. 6, the network storage apparatus 100a has CMM-A 104 and CMM-B 108, a passive PCIX backplane 116, and a CIM-1 136 and a CIM-2 140. When CMM-B 108 fails, CMM-A 104 detects the failure over the failover reset link 240, as described above, and terminates operations on CMM-B 108. CMM-A 104 then assumes control of all memory and control operations formerly conducted by CMM-B 108. When this happens, CMM-A 104 sends a command to CIM-1 136 and CIM-2 140, to disable communications with CMM-B 108. In this case, CIM-1 136 would receive this command, and disable the first switched path 208 connected to the fourth data bus 132, and to reset the PCIX bridge 200 and the channel interface 204 associated with the CMM-B 108. CIM-2 140 also receives the command from CMM-A 104, and performs the same function to disable the second switched path 212 connected to the third data bus 128, and to reset the PCIX bridge 200 and the channel interface 204 associated with CMM-B 108. In one embodiment, the passive backplane 116 contains control logic lines, which connect to the bus interface ports 144 on the CIMs 136, 140, and are connected to the CMMs 104, 108. The CMMs 104, 108 can use these control logic lines to enable and to disable the bus interface ports 144 on the CIMs 136, 140. Alternatively, other embodiments may be used to enable and disable the switched paths 208, 212, such as control logic within the CIM which receives command information via the PCIX buses on the passive backplane 116, for example.

Figure 7:
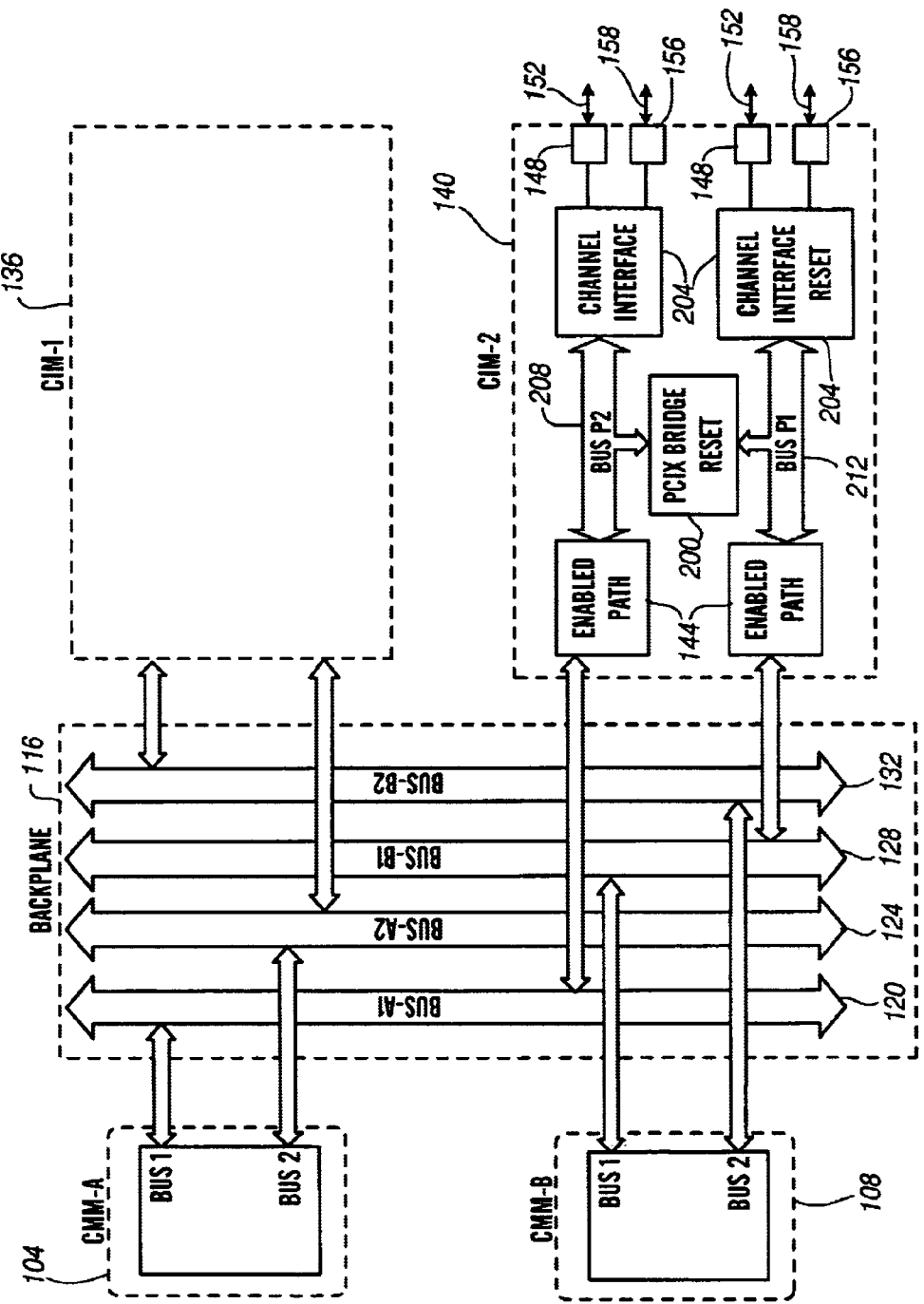
FIG. 7 is a block diagram representation of a redundant network storage apparatus showing a failed channel interface module.

Referring now to FIG. 7, the operation of the system when a CIM fails will now be described. The CMMs 104, 108 monitor the CIMs 136, 140, and in the event of an error or a failure, communicates a command over the control logic lines to terminate the operation of that CIM 136 or 140 which has failed. As depicted in FIG. 7, CIM-1 136 has a failure. CMM-A 104 determines that CIM-1 136 has had a failure, and disables CIM-1 136. CMMA-A 104 then communicates this information to CMM-B 108 via the PCIX bridge 200 on CIM-2 140.

Figure 8:
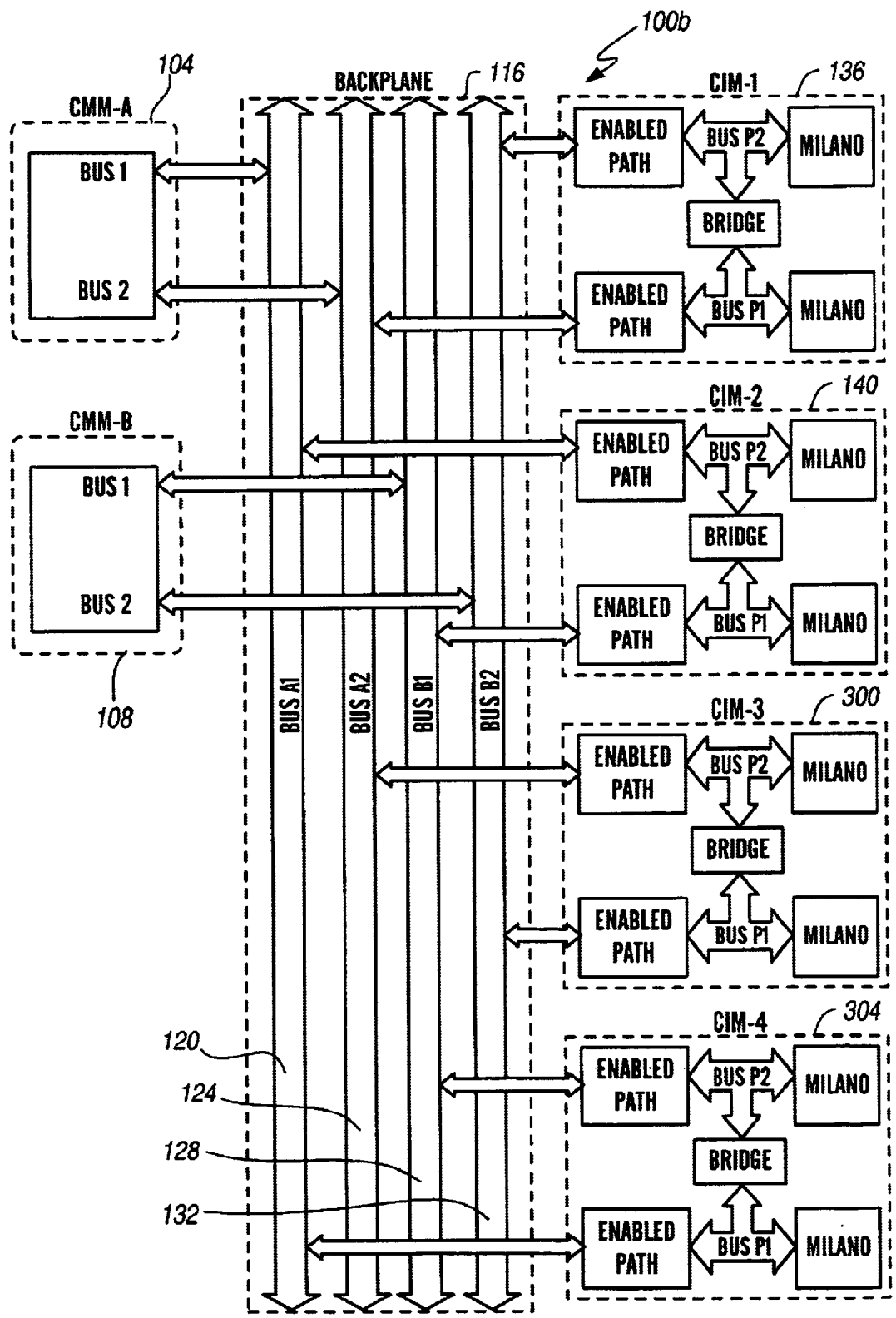
FIG. 8 is a block diagram representation of a redundant network storage apparatus showing four channel interface modules.

Referring now to FIG. 8, a block diagram of a network storage apparatus 100b is shown in which four-CIM modules are present. In this embodiment, two CMMs, CMM-A 104 and CMM-B 108, communicate to four CIMs, CIM-1 136, CIM-2 140, CIM-3 300, and CIM-4 304. In this embodiment, CMM-A 104 is connected to the first and second data buses 120, 124 in the passive backplane 116. Likewise, CMM-B is connected to the third and fourth data buses 128, 132 in the passive backplane 116. CIM-1 is connected to the second and fourth data buses 124, 132, thus giving each CMM 104, 108 access to the CIM-1 136. CIM-2 140 is connected to the first and third data buses 120, 128, CIM-3 300 is connected to the second and fourth data buses 124, 132, and CIM-4 is connected to the first and third data buses 120, 128. Thus, each CMM 104, 108 can communicate with each CIM. A network storage apparatus of this embodiment is useful in several cases including, for example, when multiple hosts are present. In this embodiment, CIM-1 136 and CIM-2 140 may provide communications to a first host, and CIM-3 300 and CIM-4 304 may provide communications to a second host. The same arrangement can be done for multiple disk nodes, such as two separate RAID arrays. As will be understood, this configurations provides for a scalable system which can provide communications between one or more host nodes and one or more disk nodes, while also providing for redundant operation. Additionally, such an embodiment may be useful to connect hosts and/or disk arrays which use a different channel medium. For example, an existing system may have two CIMs and use fibre channel connections for both the host and disk channels. If a user wanted to upgrade the system to add another disk array which used a SCSI connection, additional CIMs could be added which enable communication with a SCSI channel, allowing the upgrade of the existing system without having to replace existing hardware.

Figure 9:
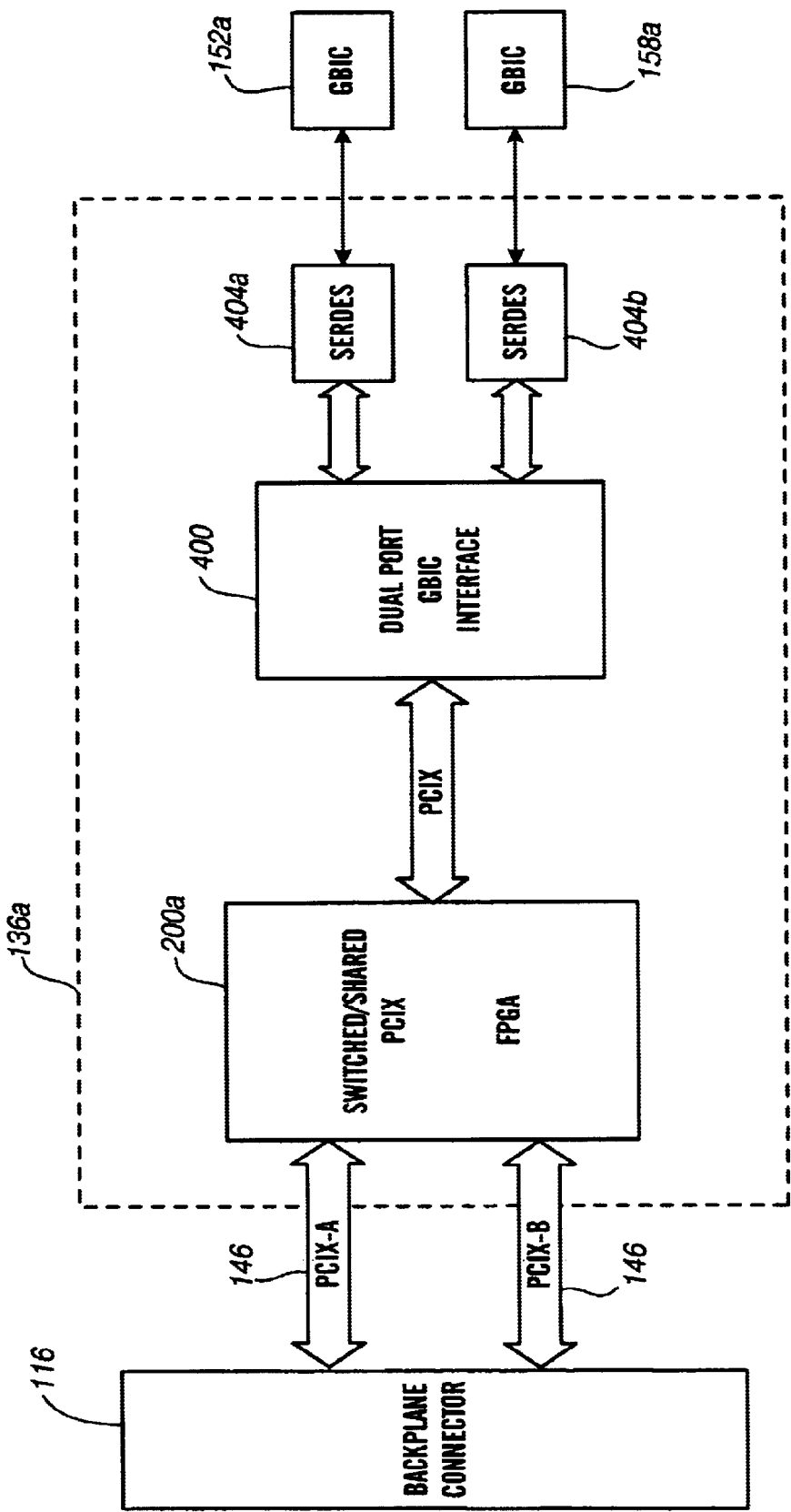
FIG. 9 is a block diagram representation of a network storage apparatus utilizing a gigabit interconnect channel.
Figure 10:
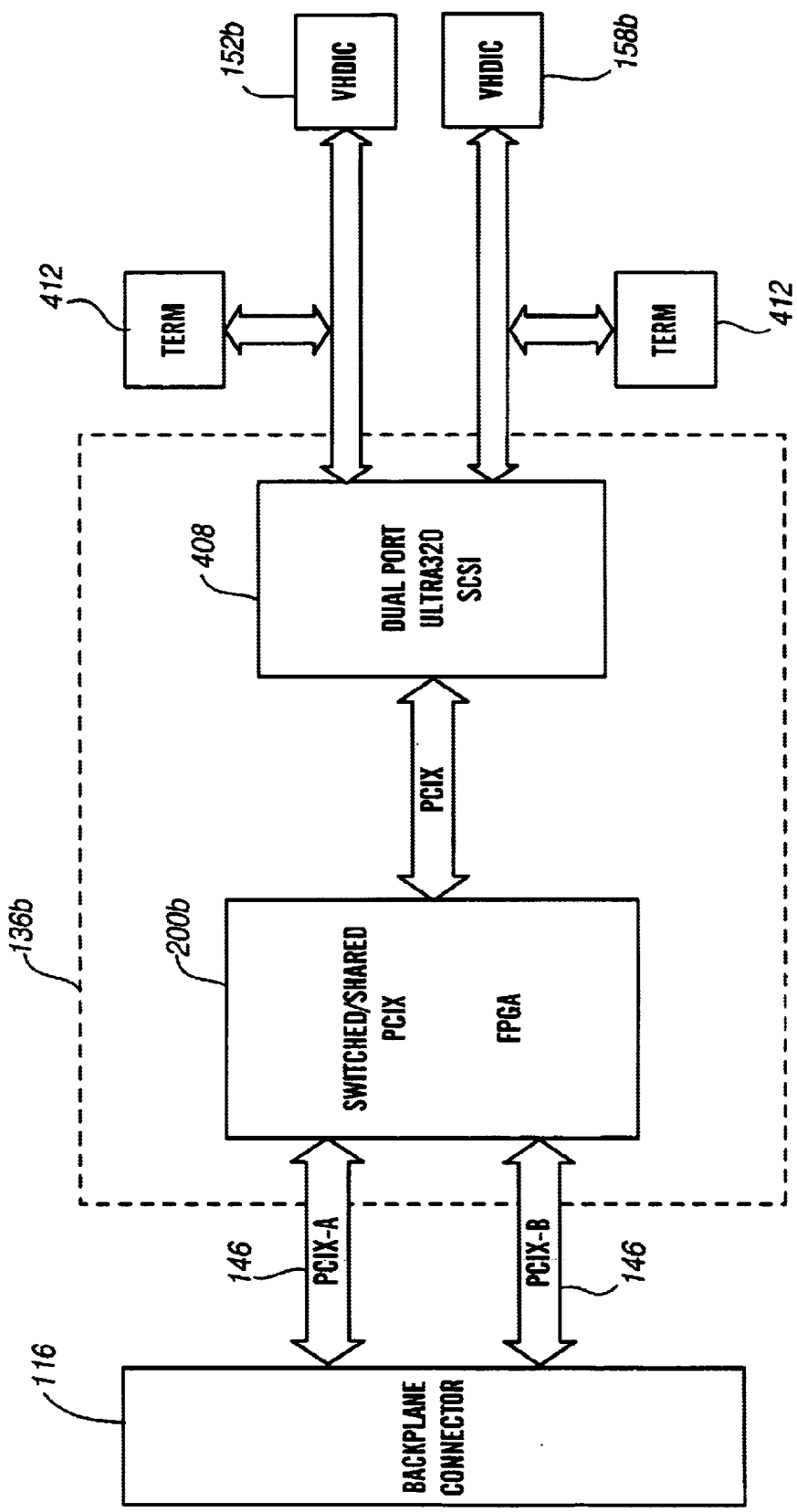
FIG. 10 is a block diagram representation of a network storage apparatus utilizing an Ultra320 SCSI channel.
Figure 11:
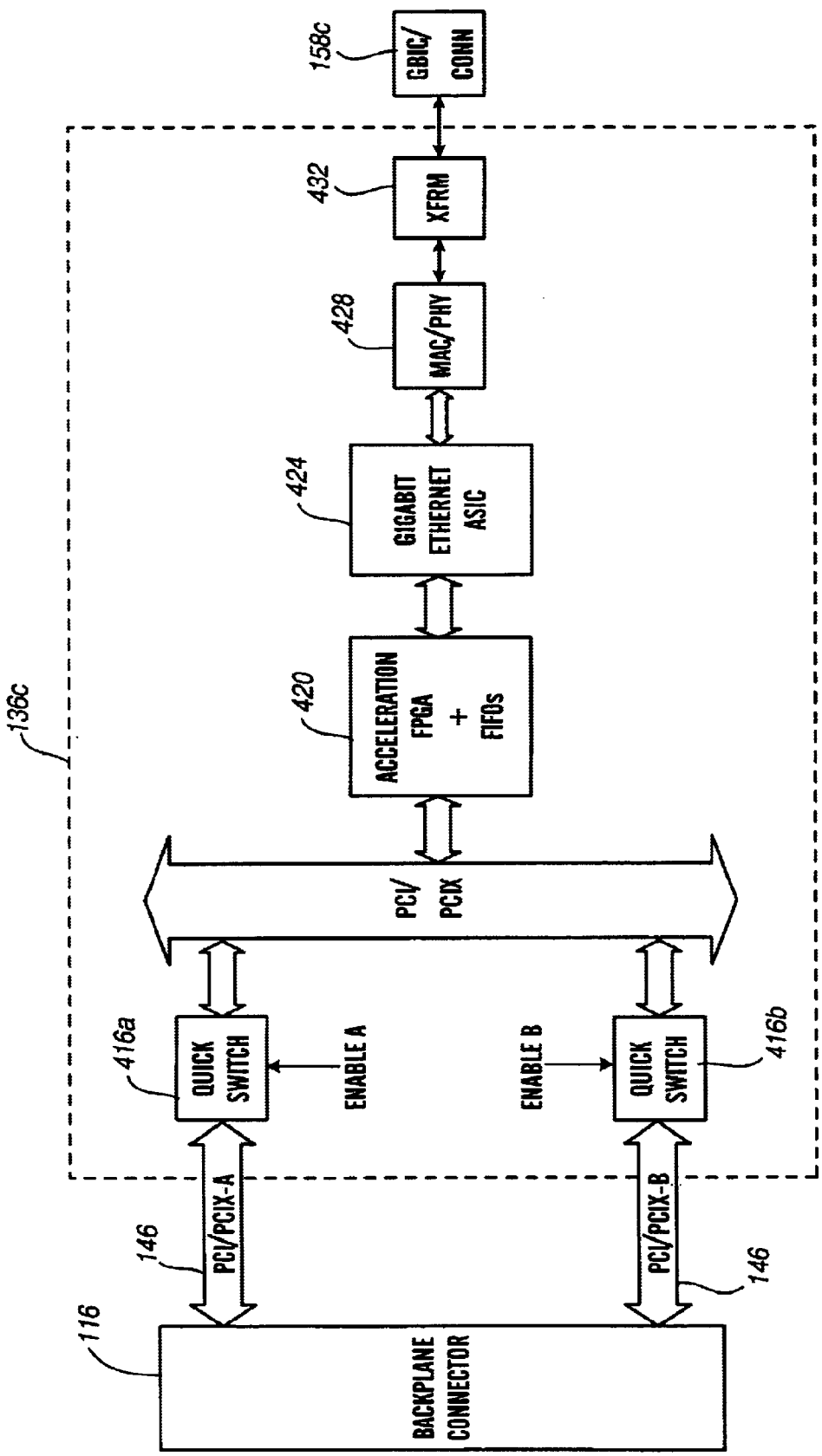
FIG. 11 is a block diagram representation of a network storage apparatus utilizing an ethernet channel.

Referring now to FIGS. 9–11, several alternative embodiments of a CIM are shown to provide an example of the different configurations a CIM may have, and the different channel mediums a CIM may connect to. FIG. 9 shows a block diagram representation of a PCIX to gigabit interconnect (GBIC) configured CIM 136a. Within the CIM 136a, the PCIX bridge 200a connects to a dual port GBIC interface 400. Each port of the dual port GBIC interface 400 connects to a serializer/deserializer (SERDES) 404a, 404b. Each SERDES 404a, 404b connects to the channel medium using a channel connection. In the embodiment shown in FIG. 9, one SERDES 404a connects to a GBIC host channel 152a, and the other SERDES 404b connects to a GBIC disk channel 158a.

FIG. 10 shows a block diagram representation of a PCIX to SCSI CIM 136b. Within the CIM 136b, the PCIX bridge 200b connects to a dual port Ultra320 SCSI interface 408. Each port of the dual port Ultra320 SCSI interface 408 connects to a host or disk channel, and also has a termination 412 connection, as is required for SCSI systems. In the embodiment shown in FIG. 10, one port of the dual port Ultra320 SCSI interface 408 connects to a very high density interconnect (VHDIC) host channel 152b, and one port of the dual port Ultra320 SCSI interface 408 connects to a VHDIC disk channel 158b.

FIG. 11 shows a block diagram representation of a PCIX to Ethernet CIM 136c, which employs quick switch connections 416a, 416b for use in the switched paths. The quick switch connections 416a, 416b are bus relays which contain enable inputs which act to enable and disable the quick switch connection 416a, 416b. Each quick switch connection 416a, 416b connects to an interface connection 420, which contains an acceleration FPGA and data FIFOs. The interface connection 420 connects to a gigabit Ethernet ASIC 424, which performs proper functions to the data to communicate the data over an Ethernet connection. The gigabit Ethernet ASIC 424 connects to a MAC/physical converter 428 which converts the signal to a physical signal, which is then routed to a transformer 432 to output the signal at the proper voltage. In one embodiment, the transformer 432 connects to a GBIC connection to a disk channel 158c. In the embodiment of FIG. 11, if a redundant system were required, shared paths would be provided on other CIMs. It will be appreciated that different channel mediums may be used in a single system using a combination of the different interface modules, such as those shown in FIGS. 9–11. For example, a host computer may connect to the network storage controller using a fibre channel medium, and the network storage controller may connect to a disk array using a SCSI channel medium.

The foregoing discussion of the invention has been presented for purposes of illustration and description. Further, the description is not intended to limit the invention to the form disclosed herein. Consequently, variations and modifications commensurate with the above teachings, within the skill and knowledge of the relevant art, are within the scope of the present invention. The embodiments described hereinabove are further intended to explain the best modes presently known of practicing the inventions and to enable others—skilled in the art to utilize the inventions in such, or in other embodiments, and with the various modifications required by their particular application or uses of the invention. It is intended that the appended claims, be construed to include alternative embodiments to the extent permitted by the prior art.

What is claimed is:

1. A method for mirroring data in a storage system including a storage array, comprising:
providing a first controller management module having a number of components including a first direct memory access engine and a first memory, said first controller management module for controlling read/write operations involving said storage array;
providing a second controller management module having a number of components including a second direct memory access engine and a second memory, said second controller management module for controlling read/write operations involving said storage array, wherein said first direct memory access engine is used in mirroring data to said second controller management module and said second direct memory access engine is used in mirroring data to said first controller management module; and
mirroring first data from said first memory of said first controller management module to said second memory of said second controller management module using said first direct memory access engine and using at least one of said number of components of said is second controller management module but not using said second direct memory access engine.

2. A method, as claimed in claim 1, wherein:
said first controller management module includes a first processor and said mirroring step includes determining that said mirroring step is to be conducted using said first processor.

3. A method, as claimed in claim 1, wherein:
said second controller management module includes a second processor and said mirroring step includes mirroring said first data independently of said second processor.

4. A method, as claimed in claim 1, wherein:
said second controller management module includes a second processor in which said second processor is used in said controlling of said read/write operations involving said storage array and said mirroring step is conducted while avoiding interruption of said second processor.

5. A method, as claimed in claim 1, wherein:
said second controller management module includes a second processor and in which said second processor is operable to be used in controlling at least one of a first read operation and a first write operation during said mirroring step.

6. A method, as claimed in claim 1, wherein:
said second controller management module includes a second processor and said mirroring step is conducted while not using said second processor.

7. A method, as claimed in claim 1, wherein
said second controller management module includes a second processor and said mirroring step includes storing said first data in non-volatile memory of said second controller management module without using said second processor.

8. A method, as claimed in claim 1, wherein:
said second controller management module includes non-volatile memory and said mirroring step includes:
marking firstly a portion of contents of said non-volatile memory that is to receive said first data as invalid and transferring said first data to said non-volatile memory in a first DMA transaction; and
marking secondly said portion of contents of said non-volatile memory as valid in a second DMA transaction.

9. A method, as claimed in claim 1, wherein:
said second controller management module includes non-volatile memory and said mirroring step includes:
storing a first string in a first memory region of said non-volatile memory, transferring said first data to said non-volatile memory, and storing said first string in a second region of said non-volatile memory.

10. A method for mirroring data in a storage system including a storage array, comprising:

providing a first controller management module including a first direct memory access engine, said first controller management module for controlling read/write operations involving said storage array;

providing a second controller management module including a second direct memory access engine, said second controller management module for controlling read/write operations involving said storage array, wherein said first direct memory access engine is used in mirroring data to said second controller management module and said second direct memory access engine is used in mirroring data to said first controller management module, said second controller management module also including non-volatile memory; and mirroring first data from said first controller management module to said second controller management module using said first direct memory access engine, said mirroring including storing a first string in a first memory region of said non-volatile memory, transferring said first data to said non-volatile memory, and storing said first string in a second region of said non-volatile memory, wherein said mirroring step-is performed using a single DMA transaction.

11. A method for mirroring data in a storage system including a storage array, comprising:

providing a first controller management module including a first direct memory access engine, said first controller management module for controlling read/write operations involving said storage array, said first controller management module includes a first processor;

providing a second controller management module including a second direct memory access engine, said second controller management module for controlling read/write operations involving said storage array, wherein said first direct memory access engine is used in mirroring data to said second controller management module and said second direct memory access engine is used in mirroring data to said first controller management module;

mirroring first data from said first controller management module to said second controller management module using said first direct memory access engine; and storing information on said storage array using said first processor and using an XOR engine to determine parity.

12. An apparatus for mirroring data in a storage system including a storage array, comprising:

a first controller management module having a number of components including a first processor and a first direct memory access engine, said first processor being used in controlling read operations and write operations involving the storage array and said first direct memory access engine being used in storing data received by said first controller management module;

a second controller management module having a number of components including a second processor and a second direct memory access engine, said second processor being used in controlling read operations and write operations involving the storage array and said second direct memory access engine being used in storing data received by said second controller management module; and a first channel interface module that can communicate with said first controller management module and that can communicate with said second controller management module; and a backplane including at least first, second, and third data buses that can provide interconnections between said first channel interface module and said first and second controller management modules;

first data being received by said first controller management module from a host and said first data being mirrored from said first controller management module to said second controller management module using said first direct memory access engine wherein each of said first and second controller management modules communicates with said first data bus, said first controller management module communicates with said second data bus but said first channel interface module does not communicate with said second data bus and said first channel interface module communicates with said third data bus but said first controller management module does not communicate with said third data bus.

13. An apparatus, as claimed in claim 12, wherein:

said first controller management module includes non-volatile memory and said first data is stored in said non-volatile memory.

14. An apparatus, as claimed in claim 12, wherein:

said first direct memory access engine is separate from but in communication with said first processor and said first processor initiates mirroring of said first data using said first direct memory access engine.

15. An apparatus, as claimed in claim 12, wherein:

said first data is mirrored to a second memory of said second controller management module of from a first memory of said first controller management module using at least one of said number of components of said second controller management module but not using said second direct memory access engine.

16. An apparatus, as claimed in claim 12, wherein:

aid second controller management module includes non-volatile memory and said first data is stored in said non-volatile memory independently of said second processor and independently of said second direct memory access engine while using at least one of said number of components of said second controller management module.

17. An apparatus, as claimed in claim 12, wherein:

said second controller management module includes non-volatile memory and said first direct memory access engine is used in providing an indication that, at least for portions of said non-volatile memory that are to receive said first data, said portions are invalid and, after said first data is received by said non-volatile memory, said first direct memory access engine is used in marking said portions as valid.

18. An apparatus, as claimed in claim 12, wherein:

said second controller management module includes non-volatile memory having at least a first storage region and a second storage region, and said first direct memory access engine is used in providing a first string for storage in said first storage region before said first data is received by said non-volatile memory and providing said first string for storage in said second storage region after said first data is received by said non-volatile memory.

19. An apparatus, as claimed in claim 12, wherein for mirroring data in a storage system including a storage array, comprising:

a first controller management module including a first processor and a first direct memory access engine, said first processor being used in controlling read operations and write operations involving the storage array and said first direct memory access engine being used in storing data received by said first controller management module, said first controller management module including a field programmable gate array and said first direct memory access engine is in communication with at least portions thereof; and a second controller management module including a second processor and a second direct memory access engine, said second processor being used in controlling read operations and write operations involving the storage array and said second direct memory access engine being used in storing data received by said second controller management module;

wherein first data is received by said first controller management module from a host and said first data is mirrored from said first controller management module to said second controller management module using said first direct memory access engine while avoiding interruption of said second processor.

20. An apparatus for mirroring data in a storage system including a storage array, comprising:

a first controller management module including a first processor and a first direct memory access engine, said first processor being used in controlling read operations and write operations involving the storage array and said first direct memory access engine being used in storing data received by said first controller management module;

a second controller management module including a second processor and second direct memory access engine, said second processor being used in controlling read operations and write operations involving the storage array and said second direct memory access engine being used in storing data received by said second controller management module; and a first channel interface module having a first shared path, said first channel interface module communicating with said first controller management module and in which said first shared path is used in transferring said first data between said first controller management module and said second controller management module.

21. An apparatus, as claimed in claim 20, further including:

a passive backplane that interconnects said first channel interface module and said first controller management module.

22. An apparatus for mirroring data in a storage system including a storage array, comprising:

a first controller management module including a first processor and a first direct memory access engine, said first processor being used in controlling read operations and write operations involving the storage array and said first direct memory access engine being used in storing data received by said first controller management module; and a second controller management module including a second processor and a second direct memory access engine, said second processor being used in controller read operations and write operations involving the storage array and said second processor controls controlling operations associated with said second controller management module while said first data is being mirrored to said second controller management module and said second direct memory access engine being used in storing data received by said second controller management module;

wherein first data is received by said first controller management module from a host and said first data is mirrored from said first controller management module to said second controller management module using said first direct memory access engine while avoiding interruption of said second processor.

23. An apparatus for mirroring data in a storage system including a storage array, comprising:

a first controller management module including a first processor and a first direct memory access engine, said first processor being used in controlling read operations and write operations involving the storage array and said first direct memory access engine being used in storing data received by said first controller management module; and a second controller management module including a second processor and a second direct memory access engine, said second processor being used in controlling read operations and write operations involving the storage array and said second direct memory access engine being used in storing data received by said second controller management module, said second controller management module including non-volatile memory having at least a first storage region and a second storage region, said first direct memory access engine being used in providing an indication that, at least for portions of said non-volatile memory that are to receive said first data, said portions are invalid and, after said first data is received by said non-volatile memory, said first direct memory access engine is used in marking said portions as valid, and said first direct memory access engine being used in providing a first string for storage in said first storage region before said first data is received by said non-volatile memory and providing said first string for storage in said second storage region after said first data is received by said non-volatile memory, said first direct memory access engine being operable to provide said first string, transfer said first data, and provide said a second string in a single direct memory access transaction;

wherein first data is received by said first controller management module from a host and said first data is mirrored from said first controller management module to said second controller management module using said first direct memory access engine while avoiding interruption of said second processor.

24. A method for mirroring data in a storage system including a storage array, comprising:

providing a first controller management module having a number of components including a first direct memory access engine, said first controller management module for controlling read/write operations involving said storage array;

providing a second controller management module having a number of components including second direct memory access engine, said second controller management module for controlling read/write operations involving said storage array, said first direct memory access engine being used in mirroring data to said second controller management module and said second direct memory access engine being used in mirroring data to said first controller management module; and mirroring first data from said first memory of said first controller management module to said second memory of said second controller management module independently of any memory storage between said first and second controller management modules wherein said mirroring is conducted without using said second direct memory access engine while using at least one component of said number of components of second controller management module.

25. A method, as claimed in claim 24, wherein:

said mirroring includes providing a passive backplane having a plurality of data buses including at least first, second and third data buses and in which at least two of said data buses are used during said mirroring.

26. A method, as claimed in claim 25, wherein:

said mirroring includes providing a first channel interface module that communicates with at least one of said plurality of data buses and said at least one data bus communicating with said first controller management module, said first channel interface module also communicating with another one of said plurality of data buses and said another one data bus communicating with said second controller management module.

27. A method, as claimed in claim 26, wherein:

said another one data bus does not communicate with said first controller management module.

* * * * *